May 3, 1966  C. J. RICKETTS  3,249,061
PUMP OR MOTOR DEVICE
Filed July 1, 1963  2 Sheets-Sheet 1
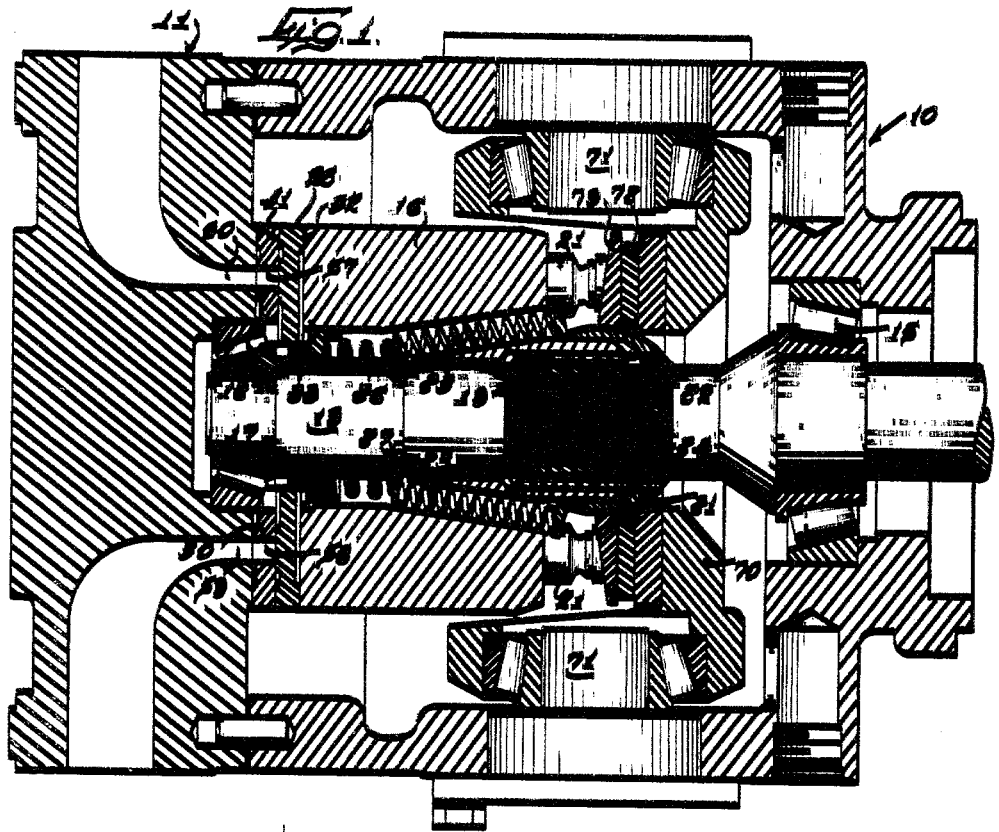
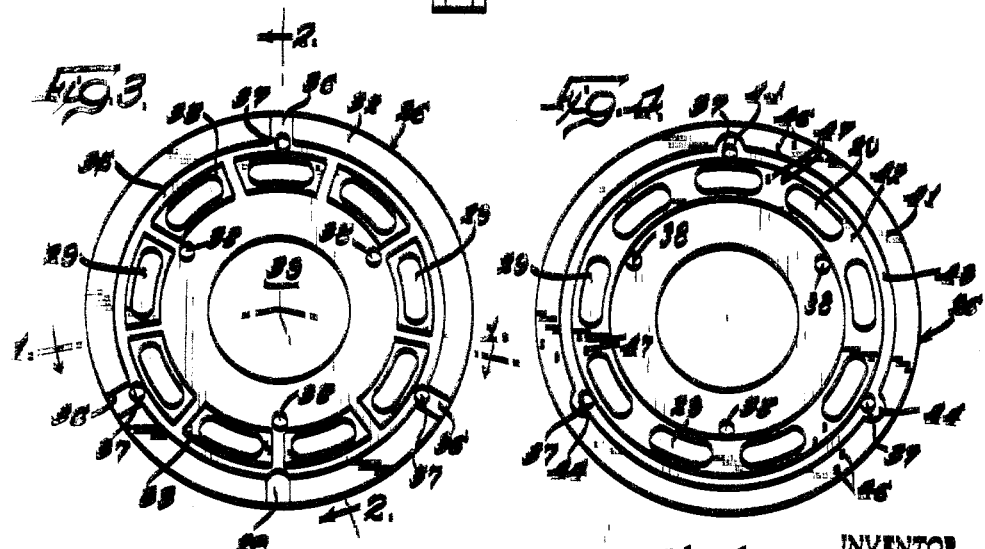
INVENTOR
Charles J. Ricketts
BY
Attys May 3, 1966  C. J. RICKETTS  3,249,061
PUMP OR MOTOR DEVICE
Filed July 1, 1963  2 Sheets-Sheet 2
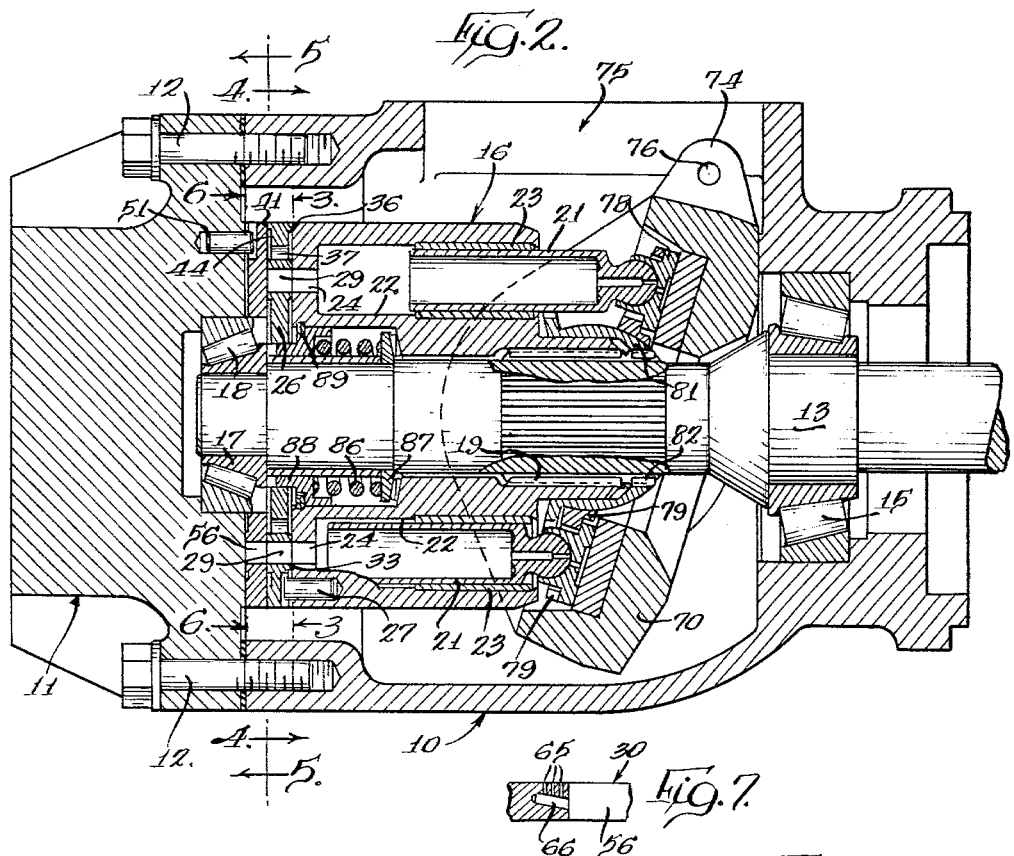
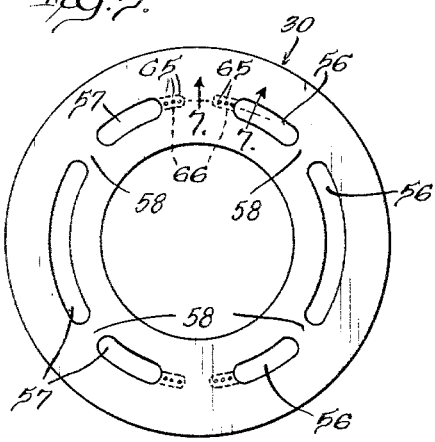
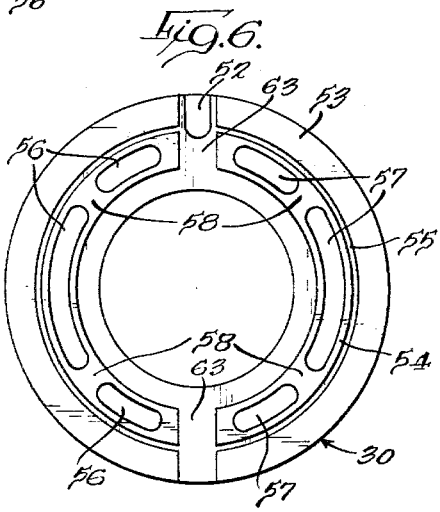

United States Patent Office 3,249,061
Patented May 3, 1966

3,249,061
PUMP OR MOTOR DEVICE
Charles J. Ricketts, Rockford, Ill., assignor to Sundstrand Corporation, a corporation of Illinois
Filed July 1, 1963, Ser. No. 291,659
13 Claims. (Cl. 103—162)

This invention relates to valving systems and more particularly to valving systems employing sliding surfaces. This invention especially relates to such a valving system adapted for use in fluid pressure translating devices of the reciprocating type such as hydraulic pumps or motors of the axial piston design.

Fluid pressure translating devices of the axial piston type are well known to the art to be often usable as either pumps or motors. Such devices usually include a drive shaft which is associated with either a cylinder block or an inclined or inclinable cam plate to create relative rotational movement between the cylinder block and cam plate. The cylinder block includes a plurality of pistons in cylinders in annular array about the axis of the cylinder block. The pistons have inner ends disposed for reciprocation within the cylinders and outer ends adapted to bear against and transmit force to or receive force from the inclined cam plate. In such devices where the cylinder block is rotatably mounted, the cylinder block includes passages from each cylinder to an end of the block for association with inlet and outlet passages in a port member or port plate. The inlet and outlet passages of the port member communicate successively with the passages from the cylinders upon relative rotation of the cylinder block with respect to the port member. The cylinder block is positively biased toward the port plate by pressure during operation of the device and by mechanical means supplementing the operating pressure, e.g. during starting of the device.

A bearing member or bearing plate may be provided mounted on the end of the cylinder block bearing against the port plate. The bearing member rotates with the cylinder block and the sliding surfaces between the port member and bearing member provide basically for the valving action. The sliding engagement of such surfaces and particularly the peripheral portions of such surfaces are critical with respect to tolerance for preventing excessive leaking therebetween. Because such fluid translating devices often operate in pumping fluids having lubricating properties or are driven by fluids having lubricating properties, some amount of leakage between the plates is desirable for lubrication of the sliding surfaces. In view of the higher pressures encountered within the ports through the port plate and bearing member, especially on the high pressure side, leakage may become excessive if the tolerances are not maintained. Thus, it is extremely important to lubricate the sliding surfaces and particularly the peripheral sliding surfaces for protection against undue wear.

A port member usable in such fluid pressure translating devices may be a port plate which may include elongate arcuate passages defining outer curved beams on the periphery of the port plates. During operation of the device, the port plate, including the peripheral curved beams are subjected to considerable loading and tend, under higher pressure operation, to fail or warp out of flat.

Where a bearing plate is used between the cylinder block and port member, it is important to maintain the bearing plate tightly against the cylinder block end so that undue leakage is not encountered and especially so that leakage will not occur between the bearing plate and cylinder block in preference to leakage between the sliding surfaces and detract from lubrication of the sliding surfaces. Bearing members may advantageously be removably mounted on the cylinder block end in order to permit their replacement without having to replace the entire cylinder block and the bearing members are therefore normally loaded against the cylinder block by mechanical means in addition to operating pressure.

It is a general object of this invention to provide new and useful valving means having increased resistance to wear by friction, erosion, and/or loading.

It is another object of this invention to provide for improved lubrication of sliding surfaces rotating relative to each other in accordance herewith.

A more specific object is to provide a canal or conduit system for directing excess lubricating oil from between such sliding surfaces while maintaining continuous peripheral surfaces in sliding contact.

Another particular object is to provide lubrication of such continuous peripheral sliding surfaces.

Still another object is to provide new and useful structural strength in port plates having arcuate passages therethrough.

Still another object of this invention is to provide improved pressure loading of a bearing plate against a cylinder block end.

An additional object of this invention is to eliminate undue erosion of port plate, bearing plate, and cylinder block ports encountered by use of fish-tail or concave ends in arcuate port plate passages on the side of the port plate disposed against the bearing plate or cylinder block without eliminating the advantageous noise reduction characteristics of such fish-tail ports.

It is also an object of this invention to provide an axial piston hydraulic fluid piston translating device which has a drivingly connected cylinder block and drive shaft within the housing, an annular series of axially disposed cylinders having pistons reciprocable therein with outer ends of the pistons urging against or being urged by an inclinable cam plate facing one end of the cylinder block, ports communicating the cylinders with the opposite end of the cylinder block, a port plate removably mounted facing the opposite end of the cylinder block and having arcuate inlet and outlet passages therethrough communicating successively with the cylinder ports upon rotation of the block wherein the port plate includes support means across the arcuate passages and includes means inhibiting cavitation or erosion while reducing noise level, a bearing plate having a bearing surface sliding against the port plate and including extensions of the cylinder port through the bearing plate to the bearing surface, the bearing plate being removably mounted on the cylinder block for rotation therewith against the port plate, means on the bearing plate for minimizing leakage of high pressure fluid from the cylinder ports at the juncture of the bearing plate and cylinder block while permitting sufficient leakage to lubricate the sliding or bearing surfaces of the port plate and bearing plate, means for removing excess lubricating hydraulic fluid from between the port plate and bearing plate and means for directing the fluid from between the port plate and bearing plate onto the bearing surfaces.

Another object of this invention is to provide a new and useful bearing member having one or more of the bearing plate features of the objects of the above paragraph.

Yet another object of this invention is to provide a new and useful port member having one or more of the port plate features set out in the object of the foregoing paragraph.

Still another object is to provide new and useful improvements in the association of sliding surfaces and especially the cooperative association of a port plate and bearing plate in a hydraulic fluid translation device.

Still other objects will become readily apparent from the following descriptions taken from the accompanying drawings in which:

FIGURE 1 is a longitudinal section, taken along line 1—1 with respect to FIGURE 3, of a hydraulic fluid translating device incorporating an embodiment of the present invention;

FIGURE 2 is a longitudinal section, taken along line 2—2 with respect to FIGURE 3, of the device illustrated in FIGURE 1;

FIGURE 3 is a partial section taken along line 3—3 of FIGURE 2;

FIGURE 4 is a partial section taken along line 4—4 of FIGURE 2;

FIGURE 5 is a partial section taken along line 5—5 of FIGURE 2;

FIGURE 6 is a partial section taken along line 6—6 of FIGURE 2; and

FIGURE 7 is a partial section taken along line 7—7 of FIGURE 5.

While this invention is susceptible of embodiment in many different forms, there is shown in the drawings and will herein be described in detail a specific embodiment thereof, with the understanding that the present disclosure is to be considered as an exemplification of the principles of the invention and is not intended to limit the invention to the embodiment illustrated.

Turning now to the figures, the embodiment illustrated is incorporated in a pump or motor of the axial piston type. The motor includes a housing indicated generally at 10, having an end plate 11 removably secured thereto by suitable screw or bolt means 12. Drive shaft 13 is rotatably supported at one end of housing 10 by means of bearings 15 and extends through cylinder block 16 to end plate 11 where the drive shaft is secured by press-fit within race 17 of mounting bearing 18 abutting end plate 11. If desired, the press-fit may be omitted and bearing 18 may be retained solely by contact with end plate 11. Bearings 15 and 18 secure drive shaft 12 against axial movement.

Drive shaft 13 is drivingly connected as by splines 19 to cylinder block 16 for rotation of cylinder block 16 and drive shaft 13 together. The splined connection 19 includes cooperating splines on the drive shaft and cylinder block with the drive shaft passing through the cylinder block. The splines are slightly crowned longitudinally to permit tilting of the cylinder block at the splined connection, thereby allowing for irregularities during the rotation of the cylinder block.

Cylinder block 16 includes pistons 21, two of which are illustrated in section in FIGURE 2 and two of which are also shown in FIGURE 1. Pistons 21 have inner ends reciprocating within bores or cylinders 22 in cylinder block 16. Bores 22 are provided with bearing inserts or bushings 23 within which the pistons reciprocate. Although only two pistons are shown in any one view in the figures, it is to be understood that cylinder block 16 includes an annular plurality of axially disposed bores or cylinders within the cylinder block, each cylinder having an inner end of a piston reciprocating therein. Although it will be apparent from the discussions below that there are nine pistons in the annular series of the illustrated embodiment, any number of pistons and cylinders may be used, as is known to the art.

Cylinders 22 are each provided with a cylinder port 24 from the bottom of the cylinder axially through cylinder block 16 to one end thereof. An annular bearing plate 26 is removably mounted on the end of cylinder block 16 for rotation therewith. Pin 27 received in slot 28 serves to align bearing plate 26 in proper mounted position. Bearing plate 26 includes a plurality of axial passages 29 in annular array. Passages 29 serve as complementary extensions of cylinder ports 24 through bearing plate 26 to the bearing surface of bearing plate 26 which is mounted against a bearing surface of annular port plate 30.

The surface of bearing plated 26 mounted against the cylinder block is best shown in FIGURE 3. This surface includes an outer annular land 32 and a plurality of separate inner lands 33 in annular array, one surrounding and defining the opening of each of passages 29. Annular groove 35 is defined between the outer annular land 32 and the inner lands 33. Also provided are radial grooves or canals 36 extending outwardly from annular groove 35 and opening at the periphery of annular bearing plate 26. Bores 37 and 38 communicate groove 35 and the inner portion of plate 26 (interiorly of lands 33 and surrounding the central opening of bearing plate 26) through the bearing plate for drainage of the bearing side of bearing plate 26 as will be further explained hereinbelow.

The bearing surface of bearing plate 26 is provided for slidable contact with the bearing surface of annular port plate 30 and can best be seen in FIGURE 4. The bearing surface includes an outer annular land 41 and an inner annular land 42. Outer land 41 provides a continuous bearing peripheral surface on the bearing plate. Inner land 42 is generally concentric with the annular array of passages 29 and includes land portions surrounding each of the openings of passage 29 on the bearing side of plate 26. Between outer land 41 and inner land 42 there is provided an annular groove 43 which has semi-circular portions or protrusions 44 into outer land 41 which serve as radial extensions of groove 43 outwardly, terminating short of the periphery of land 41 and of plate 26. Groove 43 is adapted to collect hydraulic fluid forced outwardly from between plates 26 and 30 and the semi-circular portions 44 permit such fluid to be carried into outer land 41 in sliding contact with port plate 30 for lubrication of the bearing surfaces of land 41 and port plate 30.

As viewed in FIGURE 4, bearing plate 26 rotates in a counterclockwise direction in sliding contact with the bearing surface of port plate 30 and pockets 46 are disposed adjacent semi-circular portions 44 to collect hydraulic fluid spread by the sliding surfaces from semi-circular portions 44 between the sliding surfaces, to hold the fluid and to distribute the fluid over the sliding surfaces. Additionally, during rotation of the bearing plate against the port plate, pockets 47 receive hydraulic fluid directly from communication with arcuate openings or passages 56 or 57 in port plate 30 and distribute the hydraulic fluid over the inner land 42 which is in sliding contact with the bearing surface of port plate 30. Surplus hydraulic fluid in groove 43 is drained through ports 37 and canals 36. Surplus fluid interiorly of land 42 is drained through ports 38, groove 35 and canals 36.

Turning now to FIGURES 5 and 6, port plate 30 is shown in more detail. Port plate 30 is removably mounted on end plate 11 against rotation with bearing plate 26 by suitable means such as pin 51 received in slot 52.

The surface of port plate 30 mounted against end plate 11, best seen with reference to FIGURE 6, includes an outer annular land 53, an inner annular land 54 and an annular groove 55 therebetween. Port plate 30 includes elongate arcuate inlet and outlet passages 56 and 57 passing therethrough for conducting fluid to and from cylinders 22 through passages 29 and 24. Support members such as braces or reinforcing webs 58 extend across the elongate arcuate passages or openings 56 and 57 adjacent each end of each opening, dividing each arcuate passage into a central portion and two end portions.

In operation of the illustrated device, the central portion will provide a passage for the highest velocity of hydraulic fluid passing through each of passages 56 and 57. The separate openings at the leading and trailing ends of each arcuate passage, in combination with the central portion, provide the same effective length as one long passage with webs or braces 58 acting as tensile members to reduce the effective loading on the curved beam sections peripherally of the arcuate openings. Such reduction in effective loading serves to reduce the moment at the ends of the arcuate openings to inhibit failure under high pressures and to also reduce the tendency of port plate 30 to warp out of flat.

The general configuration of passages 56 and 57 is the same on both sides of port plate 30 and is also generally the same as the configuration of end plate inlet and outlet passages 59 and 60 opening at the inner face of housing end plate 11 with the exception that support members 58 are omitted from the housing end plate passages 59 and 60.

The mounted face of port plate 30 is provided with a radial canal means 63 through lands 53 and 54 for directing hydraulic fluid therethrough to bearing 18 for lubrication thereof.

The bearing side of port plate 30 which is adapted to be disposed in sliding facial contact with the bearing side of bearing plate 26 gives a generally flat surface including openings of passages 56 and 57 and including webs or braces 58 as on the mounted side of plate 30.

Canal means are provided in port plate 30 defining a flow path between each of arcuate passages 56 and 57 and the bearing surface of port plate 30 adjacent each end of passages 56 and 57. Accordingly, three bores, indicated generally by reference numeral 65, are provided at each end of each of passages 56 and 57 in generally arcuate alignment with each other and with passages 56 and 57. Bores 65 extend part way through plate 30 and are interconnected at their lower ends and connected to the adjacent arcuate passage by means of a transverse bore 66. Each combination of bores 65 and 66 in effect provides a passage from the interior of each arcuate opening or passage adjacent the end thereof to the bearing surface of port plate 30 adjacent the arcuate passage ends.

Bores 65 are generally perpendicular with respect to the bearing surface of port plate 30 so that hydraulic fluid forced through passage 66 and passages 65 will be emitted from passages 65 in a generally perpendicular stream for entering cylinders 22 generally co-axially with cylinders 22 and pistons 21 disposed therein. The bores 65 and 66 accomplish the function of fish-tail or concave ends on the arcuate openings for reduction of noise and piston shocks in the piston chambers. In addition, the arrangement such as that provided by bores 65 and 66, permitting perpendicular co-axial charging of oil to the piston cylinders, reduces cavitation or erosion by directing the stream of hydraulic fluid entering therethrough against hydraulic fluid within the cylinder rather than against the sides of the bearing plate or bores of the cylinder block in a manner normally causing erosion or cavitation. Shocks, such as would be encountered by sudden introduction of hydraulic fluid through passage 56 into cylinders 22 as the cylinders enter the high pressure side, are minimized.

The generally perpendicular bores 65 within a given plurality, i.e. at a given end of a given arcuate passage, are of varying diameter, the larger diameter bore being disposed closest to the arcuate opening and the smallest diameter bore being disposed furthest from the arcuate opening end to provide decreasing cross section access from bore 66 to the bearing surface of port plate 30 as the extremity of the generally arcuate line of bores is reached. Thus, cylinder bores or bearing plate bores sliding over the bearing surface of plate 30 in alignment with arcuate passages 56 and 57 will be in communication with the arcuate passage even though not directly aligned therewith and will be in less communication on the basis of cross section of communicating passageway the further removed the bearing plate or cylinder block is from the end of the arcuate passageway until communication is severed, as is apparent.

Returning now to FIGURES 1 and 2, cam plate 70 is mounted within housing 10 and one end of cylinder block 16 for pivotal movement about an axis transverse to and intersecting the axis of the drive shaft. The pivotal mounting of cam plate 70 is provided by trunnions secured to housing 10 and indicated generally at 71 and 72. The cam plate is adapted to be pivoted about its axis at an incline in either direction with respect to a neutral central position for adjustment of displacement of the pistons within the cylinder block cylinders. For this purpose, projection 74 on cam plate 70 is provided to pivot the cam plate upon its axis. The projection is accessible through opening 75 in the wall of housing 10 and may be linked to suitable actuating means connectable by means of bore 76 to control the inclination of cam plate 70 as disclosed, for example, in a co-pending application of Hann et al., S.N. 95,078, filed March 13, 1961, now Patent No. 3,126,707, and assigned to the assignee of this application.

The outer ends of pistons 21 are of spherical configuration and are universally connected to bearing members such as bearing shoes 37 which are adapted to slide upon an annular cam plate thrust bearing member or surface supported on cam plate 70. A hold-down member, such as ring 79, engages bearing shoes 78 and carries the bearing shoes in slidable contact with the bearing member of cam plate 70. Spherical collar 81, splined at 82 for rotation with an axial movement relative to shaft 13, is slidable on and piloted by a cylindrical projection of cylinder block 16 for axial movement of collar 81 with respect to cylinder block 16 and shaft 13. An annular series of compression springs 83, each anchored on shaft 13, and projecting through recesses in cylinder block 16, bias the spherical collar 81, carrying hold-down ring 79 in the direction of cam plate 70, thereby urging bearing member 78 against the bearing surface of cam plate 70. Shim 84 functions to maintain bearing members 78 in close proximity with the bearing surface of cam plate 70 without respect to the urging of compression springs 83.

A coil spring 86, grounded on shaft 13 through annular collar 87, biases annular collar 88 abutting snap ring 89 secured to cylinder block 16 and thereby urges cylinder block 16, bearing plate 26 and port plate 30 against housing end plate 11. The urging of coil spring 86 tends to maintain the end of cylinder block 16, bearing plate 26 and port plate 30 in surface-to-surface contact and further tends to prevent disengagement of pins 27 and 51 from slots 28 and 52 respectively. The bearing surfaces of bearing plate 26 and port plate 30 are urged in face-to-face slidable contact, the bearing plate being rotatable with the cylinder block while the port plate is retained against rotation on housing end plate 11. The bearing surfaces of bearing plate 26 and port plate 30 may advantageously be of a hardened wear-resistant material such as hardened steel or bronze; conveniently, the entirety of the bearing plate and/or port plate may be of such wear-resistant material.

In operation of the device as a motor, fluid valved through the arcuate passages of port plate 30 enters the piston cylinders on the high pressure side or inlet side of the port plate. The pistons urge against the cam plate which is inclinable by movement of projection 74 in the usual manner to effect sliding of the bearing shoes down the cam plate incline resulting in the rotation of cylinder block 16 and shaft 13 splined thereto. The annular series of cylinder block passages are successively brought into association with the high pressure or inlet passage of the port plate and then with the low pressure of the outlet passage in conventional manner as block 16 rotates.

As the fluid enters through the inlet passage 56, a portion of the fluid is diverted through bores 66 and 65 and thence through passages 29 and 24 and into the cylinder prior to direct alignment of the cylinder with the arcuate inlet passage 56. Such diversion of high pressure fluid permits introduction of pressure into the piston chamber prior to the alignment of the passages 29 and 24 with arcuate passage 56 thereby minimizing shock within cylinder 22 which may otherwise occur due to sudden communication of cylinder 22 with the high pressure fluid.

Additionally, as a given cylinder is rotated toward communication with the high pressure or inlet side, bores 65 are disposed to eject the hydraulic fluid to the cylinder in a direction co-axial with the cylinder and piston therein, thereby minimizing erosion of passage walls such as the walls of passages 24 and 29.

In like manner, at the end of the high pressure side, passages or bores 66 and 65 permit gradual withdrawal of the high pressure from communication with cylinder 22. Further, bores 65 and 66 at the ends of arcuate outlet 57 minimize shock which may otherwise occur from sudden association of cylinder 22 with the outlet passage for exhausting of hydraulic fluids therefrom. Where it is desired to operate the device as a pump, the outlet and inlet are reversed and it will be apparent that the passages formed by bores 65 and 66 also serve to reduce piston cylinder shock in pump applications.

As cylinder block 16 rotates, bearing plate 26 slides against port plate 30 and is biased thereagainst by the force of pistons on the cam plate and by coil spring 86 which is grounded on the drive shaft. A portion of the blow-by hydraulic fluid leaking from between the port plate and bearing plate is collected in annular groove 43 and spread by means of semi-circular portion 44 and pockets 46 over the surface of land 41 and the opposing surface of port plate 30 for lubrication purposes. Any excess fluid leaking from between the bearing plate and port plate is drained to the fluid reservoir in the housing through ports 37 and 38, annular groove 35 and canals 36.

The combination of semi-circular portions 44 and pockets 46 provides excellent lubrication and cooling of the outer land 41 where needed most because the surface of outer land 41 is a critical bearing surface and has the highest surface speed. The excess exhausted fluid is in effect directed back toward the cylinder block where it is exhausted between the bearing plate and cylinder block which rotate together. Thus, the outer land 41 is maintained continuous permitting an uninterrupted bearing surface which minimizes the entrance of dirt between the bearing surfaces and permits a continuous hydrodynamic oil film to build up between the sliding surfaces.

During rotation of the bearing plate against the port plate, hydraulic fluid from inlet port or passage 56 is introduced into pockets 47 in inner land 42 for spreading over the surface of inner land 42 and the opposing surface of port plate 30 for lubrication of the sliding surfaces.

The separate lands 33 surrounding each of the openings of passages 29 on the face of bearing plate 26 disposed against the end of the cylinder block are maintained pressure loaded against the end of the cylinder block during operation. The raised land is provided for the purpose of minimizing the area exposed to pressure so that bearing plate 26 is clamped by pressure to the cylinder block while the block rotates in operation of the device as a pump or motor.

Although the anticavitation passages formed by bores 65 and 66 have been described as communicating with arcuate passages 56 or 57 at the end edges thereof, it is to be understood that such anticavitation passages may be of other form. For example, it will be apparent that the anticavitation passages may be straight through bores or orifices such as would be present if bores 65 were extended completely through the thickness of plate 30 and bores 66 were eliminated.

The anticavitation means need be provided only on the leading edge or end of the arcuate passages. The leading edge or end of the passage 56 or 57 is considered as that edge first coming into communication with passages 24 during rotation of passages 24 relative to passage 56 or 57; the trailing edge or end is the edge of passage 56 or 57 which finally terminates such communication during a given revolution of such rotation. When the device is designed for operation by rotation of the cylinder block in either direction, e.g., as a motor, it is preferred to provide the anticavitation means illustrated in the form of passages 65 and 66 on both the leading and trailing edges of arcuate passages 56 and 57 as is illustrated in FIG. 5. When the device is designed for rotation of the cylinder block in one direction, e.g., to be used as a pump, the anticavitation means may be omitted as unnecessary on the trailing edge of each of passages 56 or 57. For example, bores 65 and 66 may be omitted from the trailing edges of passages 56 and 57 and passages 56 and 57 may be extended in arcuate length to include the region where the omitted bores 65 and 66 would normally be positioned, thereby substituting additional or extended arcuate lengths of passages 56 and 57 for the anticavitation means to obtain sharp flow cutoff at piston dead center.

Although the present invention has been described above with respect to a separate bearing plate 26 and port plate 30, it is to be understood that the present invention is applicable where either or both of such separate plates are not used. For example, the arcuate inlet 56 and outlet 57 may be formed as a portion of the end plate 11 as continuations of inlet 59 and outlet 60 respectively and passages 29 may be formed in the end of cylinder block 16 as continuations of passages 24; the passage formed by bores 65 and 66 would accordingly communicate with inlet 59 and outlet 60 at least at the leading ends thereof for pump operation or at both ends thereof for motor operation. Other modifications will be apparent to those in the art.

I claim:

1. In a hydraulic fluid translation device including a housing, a rotatable cylinder block in said housing having a plurality of pistons with inner ends disposed for reciprocation within cylinders in the block, cylinders ports communicating each of said cylinders with one end of said cylinder block, and inlet and outlet passages communicating exteriorly of said housing, a bearing plate mounted on said one end of the cylinder block for rotation therewith and having an opening therethrough in alignment with each of said cylinder ports, a port plate mounted on said housing against rotation with the cylinder block and having elongate generally arcuate openings therethrough communicating respectively with said inlet and outlet passages, relatively rotatable and stationary bearing surfaces on said bearing plate and port plate, respectively, for rotation of said cylinder block with respect to said housing with said cylinder ports communicating successively with said inlet and outlet, and resilient means urging said bearing surfaces to bear against each other, the improvement which comprises support means disposed across each of the elongate arcuate openings of said port plate, port means generally vertical through said stationary bearing surface in arcuate alignment with the arcuate opening laterally of said arcuate opening and communicating interiorly with said arcuate opening, raised land means on the opposing surface of said bearing plate surrounding said openings therethrough, outer and inner generally annular lands on one of said bearing surfaces defining a generally annular groove therebetween, outward extension of said annular groove into the outer land, pocket means in said outer land disposed axially from said radial extension and adapted to receive, hold and distribute hydraulic fluid from the radial groove extension on the bearing surfaces, and passage means from said annular groove through said bearing plate and radially adjacent said cylinder block for directing hydraulic fluid to said housing radially of said cylinder block.

2. In a hydraulic fluid translation device including a housing, a rotatable cylinder block in the housing having a plurality of pistons with inner ends disposed for reciprocation within cylinders in the block, cylinder ports communicating each of said cylinders with one end of said cylinder block, and inlet and outlet passages communicating exteriorly of said housing, a bearing plate mounted on said one end of the cylinder block for rotation therewith and having an opening therethrough in alignment with each of said cylinder ports, a port plate mounted on said housing against rotation with the cylinder block and having generally arcuate openings therethrough communicating respectively with said inlet and outlet passages, relatively rotatable and stationary bearing surfaces on said bearing plate and port plate, respectively, for rotation of said cylinder block with respect to said housing with said cylinder ports communicating successively with said inlet and outlet, and resilient means urging said bearing surfaces to bear against each other, in combination therewith the improvement comprising, outer and inner generally annular lands on the bearing surface of said bearing plate defining a generally annular groove therebetween, outward extension of said annular groove into the outer land, and passage means from said annular groove through said bearing plate and radially adjacent said cylinder block for directing hydraulic fluid to said housing radially of said cylinder block.

3. In an axial piston fluid translating device comprising a rotatable cylinder block, an annular series of axially disposed cylinders within said block, ports communicating the cylinders with one end of said cylinder block, a port plate having arcuate inlet and outlet passages adjacent said one end of the cylinder block communicating successively with said cylinder ports upon rotation of the cylinder block, a plurality of anticavitation bores in said port plate from the surface facing said cylinder block adjacent each end of each arcuate passage in lateral arcuate alignment with the adjacent arcute passage, said bores of each plurality being of a substantially lesser diameter than the width of the adjacent arcuate passage and the bores of each plurality differing in diameter with diameters decreasing laterally of the adjacent passage, a bore interconnecting each plurality of bores with its adjacent arcuate passage, and resilient means urging said cylinder block against the port plate.

4. The device of claim 3 including a bearing plate mounted on said cylinder block for rotation therewith between said port plate and cylinder block having an annular series of axial passages in alignment with said cylinder ports.

5. An axial piston hydraulic fluid translating device comprising a housing, a rotatable cylinder block in said housing, an annular series of axially disposed cylinders within said block, ports communicating the cylinders with one end of said cylinder block, a bearing plate mounted on said one end of the cylinder block for rotation therewith, an annular array of axial bearing plate ports through said bearing plate, each bearing plate port being aligned for communication with a separate cylinder port, a separate raised land surrounding each of said bearing plate ports at its communication with the cylinder port, and resilient means urging said cylinder block against said bearing plate and said bearing plate against the housing.

6. The device of claim 5 including a port plate having inlet and outlet passages mounted on the housing between the housing and bearing plate communicating successively with said bearing plate ports upon rotation of the cylinder block.

7. A bearing member adapted to bear against the surface of a member relatively rotatable with respect thereto, which bearing member comprises a generally symmetrical annular plate having a flat bearing surface, a pair of generally concentric arcuate ports therethrough and enclosed conduit means therein adjacent the end of each port and in generally circumferential alignment therewith extending from the flat surface into the adjacent port and permitting fluid flow from the ports through the conduit.

8. In a hydraulic fluid translation device including a housing, a rotatable drive shaft in said housing adapted to drive or be driven by a rotatable cylinder block having a plurality of pistons with inner ends disposed for reciprocation within cylinders in the block, an inclined cam plate spaced from one end of said cylinder block and disposed to receive thrust from or impart thrust to said pistons at their outer ends during rotation of said cylinder block, cylinder ports communicating each of said cylinders with the other end of said cylinder block, and inlet and outlet passages communicating exteriorly of said housing, an annular bearing plate mounted on said other end of the cylinder block for rotation therewith and having an opening therethrough in alignment with each of said cylinder ports, an annular port plate mounted on and abutting said housing against rotation with the cylinder block and having generally arcuate openings therethrough communicating respectively with said inlet and outlet passages, relatively rotatable and stationary bearing surfaces on said bearing plate and port plate, respectively, between said cylinder block and said housing respectively for rotation of said cylinder block with respect to said housing with said cylinder ports communicating successively with said inlet and outlet, and resilient means urging said bearing surfaces to bear against each other, support means disposed across each of said elongate arcuate openings adjacent opposite ends of said openings forming a central portion of each opening defining the highest velocity of fluid passage through each arcuate opening, a plurality of anticavitation ports generally vertical from said stationary bearing surface into said port plate in arcuate alignment with the arcuate opening laterally thereof, lateral channel means communicating said plurality of anticavitation ports with the interior of said arcuate opening, separate raised lands on the opposing surface of said bearing plate surrounding each of said openings therethrough providing a substantially smaller area exposed to pressure between said bearing plate and cylinder block end during operation of the fluid translating device, outer and inner generally annular lands on one of said bearing surfaces defining a generally annular groove therebetween adapted to receive hydraulic fluid blow-by from said cylinder ports between said bearing surfaces, a plurality of radial extensions of said annular groove, pocket means in said outer land disposed axially from said radial extension and adapted to receive, hold and distribute hydraulic fluid from the radial groove extension on the bearing surfaces, passage means from said annular groove through said bearing plate and radially adjacent said cylinder block for directing hydraulic fluid to said housing radially of said cylinder block, a pair of generally annular raised lands on the surface of said port plate abutting the housing, the inner of said lands containing said arcuate openings, and radial channel means traversing said lands for directing hydraulic fluid exteriorly of said lands to interiorly of said lands for lubrication of bearings in said housing rotatably mounting an end of said shaft disposed centrally of said port plate.

9. A hydraulic fluid translating device, comprising: a valve member having arcuate inlet and outlet ports therein, a rotatable cylinder block slidably engaging said valve member, having a plurality of pistons with inner ends disposed for reciprocation within cylinders in said block, cylinder ports communicating each of said cylinders with the end of the block engaging the valve member, said valve member having a valving surface engaging said cylinder block, said valve member having port means adjacent the leading end of one of said arcuate passages providing unobstructed advance communication between said cylinders and said one passage as the cylinders approach said one passage, said port means having a portion extending substantially perpendicular from said valving surface a sufficient distance so that fluid flow through said portion is substantially axial to reduce erosion, said port means including a portion extending generally transverse to the axis of said cylinder block providing communication between said first port means portion and said one passage, and said port means having a radial width less than said one passage to provide gradual communication between the approaching cylinders and said one passage.

10. A hydraulic fluid translating device as defined in claim 9 wherein said port means are generally arcuate and aligned with said one arcuate passage, said first portion of said port means decreasing in width away from the end of said one passage to provide gradual communication between the approaching cylinders and said one passage.

11. A hydraulic fluid translating device as defined in claim 9, wherein said port means includes a plurality of anticavitation bores extending substantially perpendicular from said valve surface adjacent the end of said one arcuate passage, said bores being of lesser diameter than the width of said one arcuate passage, said bores decreasing in diameter away from said one passage, and a laterally extending passage interconnecting said bores with said one arcuate passage.

12. A hydraulic fluid translating device, comprising: a valve member having generally arcuate inlet and outlet passages communicating with a valve surface thereon, a rotatable cylinder block having a bearing surface engaging said valving surface, said cylinder block having a plurality of pistons with inner ends disposed for reciprocation within cylinders in said block, cylinder ports communicating each of said cylinders with said bearing surface adapted to serially communicate with said inlet and outlet passages, one of said surfaces having generally annular inner and outer lands thereon defining a generally annular groove therebetween, said inner and outer lands being positioned so that said groove has a greater radius than said inlet and outlet passages so that the groove receives fluid leakage from the passages and the cylinder block ports between said surfaces, said outer land being continuous to provide an uninterrupted bearing surface with the other surface, said outer land having at least one recessed portion communicating with said one surface and said annular groove to receive leakage fluid from said groove and distribute fluid over said sliding surfaces, and drainage passage means extending generally axially from said annular groove for removing excess leakage fluid therefrom.

13. A hydraulic fluid translating device as defined in claim 12, and further including a separable bearing plate on said cylinder block engaging said valving surface on said valve member, the engaging surface of said bearing plate defining said cylinder block bearing surface, said lands and grooves being formed in said bearing plate surface, said passage means including an axially extending passage through said bearing plate, and a radially extending discharge passage on the surface of the bearing plate engaging said cylinder block.

References Cited by the Examiner

UNITED STATES PATENTS

| | | | |
|---|---|---|---|
| 2,313,407 | 3/1943 | Vickers et al. | 103—162 |
| 2,619,041 | 11/1952 | Born | 103—162 |
| 2,963,983 | 12/1960 | Wiggermann | 103—162 |
| 2,972,962 | 2/1961 | Douglas | 103—162 |
| 3,051,093 | 8/1962 | Budzich | 103—162 |

FOREIGN PATENTS 1,260,078   3/1961   France.

SAMUEL LEVINE, *Primary Examiner.*

LAURENCE V. EFNER, *Examiner.*